United States Patent Office 3,707,380
Patented Dec. 26, 1972

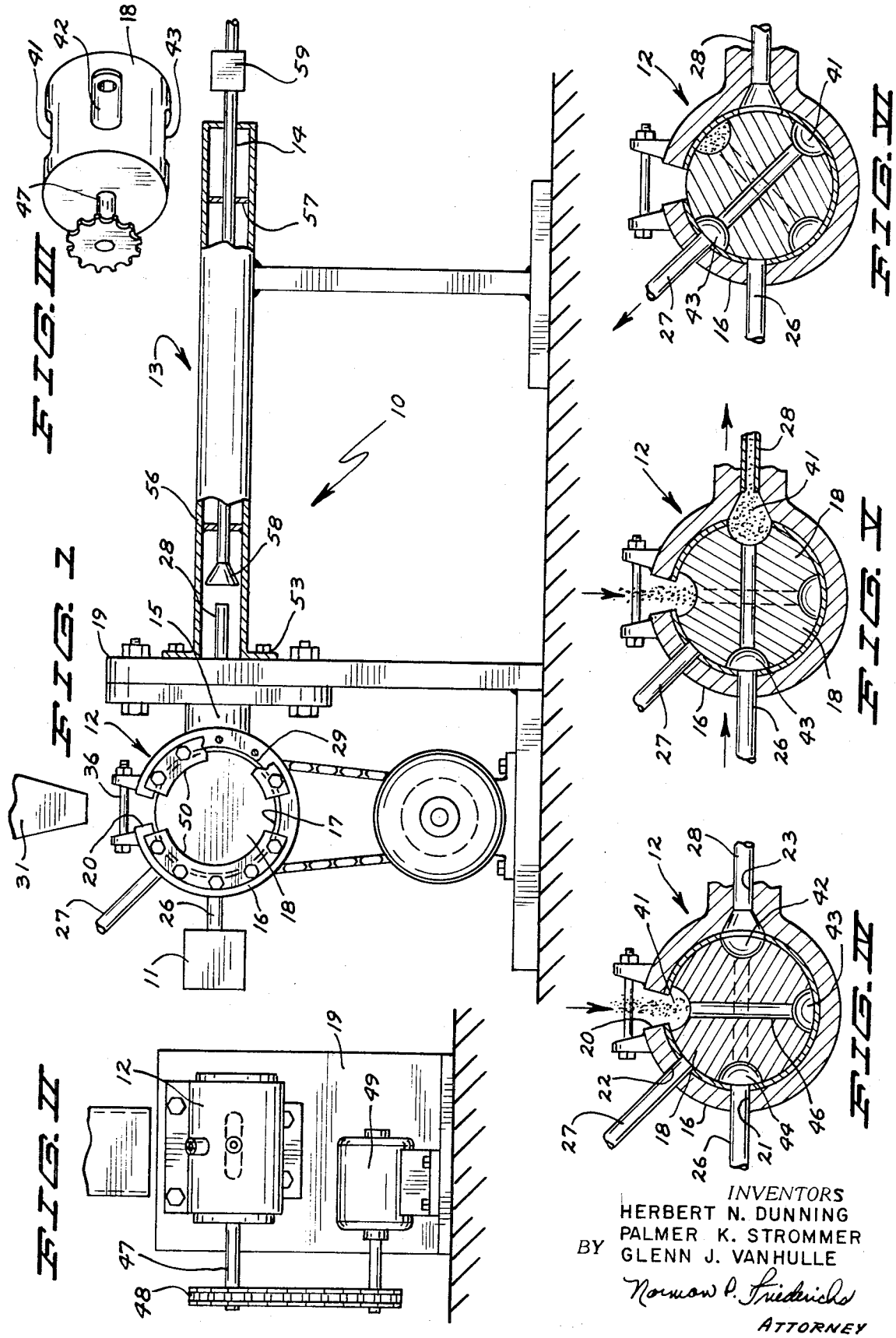

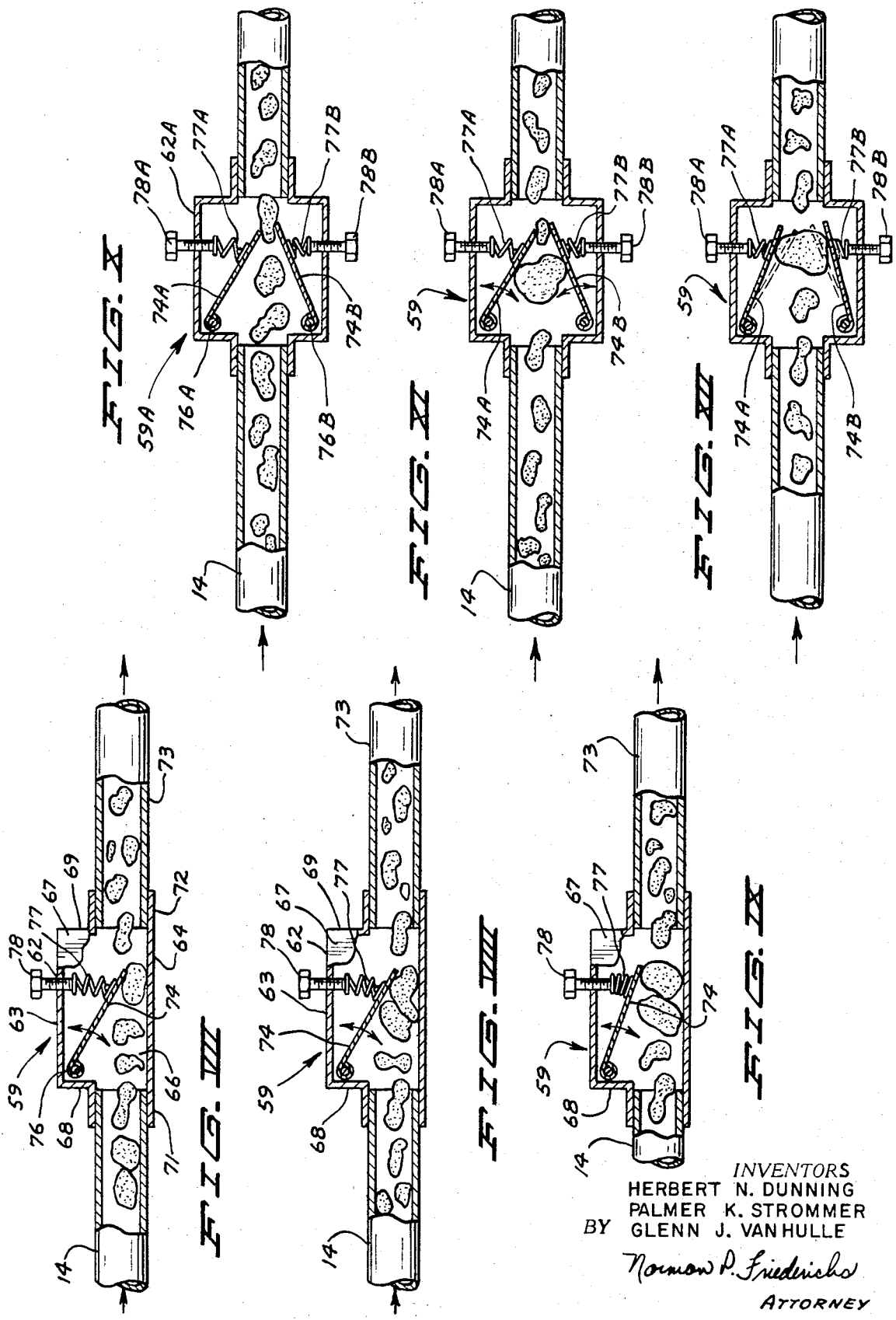

3,707,380
METHOD AND APPARATUS OF
TEXTURING PROTEIN
Herbert N. Dunning, Minneapolis, Palmer K. Strommer, Osseo, and Glenn J. Van Hulle, Minneapolis, Minn., assignors to General Mills, Inc.
Filed Oct. 27, 1970, Ser. No. 84,385
Int. Cl. A23j 1/14
U.S. Cl. 99—17
7 Claims

ABSTRACT OF THE DISCLOSURE

A method for texturing particulate protein material by which the protein material is fed into an elongated treating chamber which is under pressure having an inlet at one end and an outlet at the other end and then subjecting the protein material to a steam flow from the direction of the inlet to propel the material through the elongated chamber and out the outlet, wherein the outlet opening is adjustably controlled in accordance with the amount of pressure in the chamber. Apparatus can be employed in carrying out this process.

BACKGROUND OF THE PRESENT INVENTION

The present invention relates to treating of food products and more particularly to texturizing fine particulate protein food products.

In recent years substantial effort has been directed toward treating vegetable protein materials so as to provide such materials with texture and other characteristics commonly found in animal meat products. The vegetable protein materials are primarily soybean meal and flour, however, various other oil seed meals and flours also are used, such as peanut, cottonseed and sesame seed meals and flours. It is generally preferred to use protein concentrates of such oil seed meals, typically including at least about 50% protein by weight.

Various types of methods and apparatus have been used in the past to texturize the vegetable protein material. For example, solubilized soy protein has been extruded into an acid bath thereby forming texturized fibers. Untexturized protein material contains protein in discrete particles. Texturization takes place when the protein acquires a substantially continuous phase. The texturized material, when moist, is somewhat tough or chewy much like meat. The term "texturizing" as used herein will refer to the process of changing the discrete particles of protein into continuous phase protein.

It was recently discovered that finely-divided particulate protein material may be texturized by passing the material through an elongated cylinder or pipe and applying elevated pressure and temperature. Although this recently discovered method provides highly satisfactory texturized protein, certain problems were confronted during sustained operation. For example, at times pieces of texturized protein were produced that plugged or blocked the apparatus thus necessitating shutting down operation and disassembling of the apparatus. The present invention provides improved apparatus that overcomes such problems. Moreover, the present invention permits increase in processing rates by as much as 50% or more together with an increase in product quality. The present invention also permits much smoother operation of the texturizing process.

The protein material to be processed according to the present invention may be of the type used in previous texturizing processes. This typically includes the various defatted oil seed meals and flours such as soybean, peanut, cottonseed and sesame. Various other untextured protein materials such as wheat gluten, yeast, sodium caseinate and the like may be texturized according to the present invention. The protein material used in the present invention is preferably a flour-like material, particularly soybean.

THE PRESENT INVENTION

Apparatus according to the present invention is shown in the drawings as follows:

FIG. I shows a side view of the apparatus with portions broken away.

FIG. II shows an end view of the apparatus.

FIG. III shows a portion of a valve of the apparatus.

FIGS. IV-VI show cross sectional views of the valve in various positions of operation.

FIGS. VII-IX show a nozzle of the present invention in various positions of operation.

FIGS. X-XII show an alternative nozzle of the present invention.

The texturizing apparatus 10 (FIG. I) may include a rotary valve 12, a pressure tank 13 and a tube 14. The texturizing apparatus 10 is connected to a high pressure fluid source 11 such as a steam boiler which is capable of providing a fluid or steam pressure to the rotary valve 12 sufficient to texturize the protein material.

The rotary valve 12 includes a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for material to be texturized. The housing 16 (FIG. IV) further includes openings 21, 22 and 23 for reception of pipes 26, 27 and 28, respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to the feeding of protein material to the valve 12 through opening 20. Pipe 28 is the outlet through which protein material leaves valve 12. A hopper 31 (FIG. I) may be provided for feeding protein material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. III-VI) may be of steel and may be constructed from a solid cylinder or alternatively it may be formed by casting. The member 18 is provided with any desired number of material conveying pockets such as 41, 42, 43 and 44. The member 18 will normally have an even number of such pockets, typically four, six or eight. A passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. I). The valve member 18 may be held in position in housing 16 by restraining plates, such as plate 50 which is secured to housing 16 by screws.

The pressure tank or surge tank 13 and the tube 14 in the embodiment shown in FIG. I may be concentric pipes. The pressure tank 13 may be secured to the support bracket 19 by flange 53. The pressure tank 13 may be further supported by one or more legs such as leg 54.

The tube 14 is mounted in pressure tank 13 such as by spider flanges 56 and 57. The pressure tank 13 is sealed from the atmosphere except through tube 14. If desired, a portion 58 of tube 14 nearest to valve 12 may be flared radially outwardly for ready reception of the protein material from pipe 28. Space is provided between the outermost edge of flared portion 58 and the adjacent wall of pressure tank 13 so that the pressure may equalize throughout tank 13.

The tube 14 has a nozzle 59 which limits the escape of pressure from the texturizing apparatus 10 thereby providing a build up of pressure in tank 13.

One preferred embodiment of the present nozzle is shown in FIGS. VII–IX. The nozzle 59 has a body portion 62 which may be rectangular in shape having an upper wall 63, a lower wall 64, a pair of side walls 66, 67 and a pair of end walls 68, 69. The body portion 62 may be constructed from metal plate, such as by welding. The end walls 68, 69 are each provided with a tubular portion 71, 72, respectively, for connecting the nozzle to the pipe 14 and, if desired, to a conveying pipe 73. The tubular portions may be threadedly engaged with the respective pipes. The nozzle further includes a flapper or gate 74 which is pivotably mounted in body portion 62 such as by pin 76. The gate 74 preferably sealingly engages side walls 66 and 67. However, gate 74 must be free to move or pivot with respect to side walls 66 and 67. The nozzle has a spring 77 which urges the gate 74 towards the closed position and provides compressive force on the gate 74. The spring 77, for example, may be a coil spring, a leaf spring or a pneumatic spring. A screw 78 is shown for adjustment of the compressive force exerted by the spring 77 and thus permits a certain amount of adjustment of the pressure in the pipe 14.

Another preferred embodiment of the nozzle is shown in FIGS. X–XII. The nozzle 59A may be constructed similar to nozzle 59 and has a body portion 62A. Nozzle 59A has a pair of flappers or gates 74A and 74B. If desired, nozzle 59A may have additional gates arranged around the path of the product. If the nozzle includes three or more gates, it is desirable to taper the gates so that the outer ends of the gates may move into a sufficiently restrictive position to maintain the necessary pressure. The gates 74A and 74B may be constructed similar to gate 74 and are mounted on pins 76A and 76B, respectively. The nozzle 59A has a spring 77A which urges gate 74A towards a closed position and a spring 77B which urges gate 74B towards a closed position. Screws 78A and 78B are provided for adjustment of the tension on springs 77A and 77B, respectively. The springs 77A and 77B are shown as coil springs; however, it should be recognized that other means may be used to control gate position and thus the orifice size such as a leaf spring or pneumatic spring.

OPERATION OF THE PRESENT INVENTION

The protein material may be added to the texturizing apparatus 10 such as through the hopper 31. If desired, suitable provision may be made for metering or controlling the amount of feed material passing through hopper 31. The feed material leaving hopper 31 falls through opening 20 in the housing 16 of valve 12 thus being deposited, for example, in pocket 41 as shown in FIG. IV. The valve member 18 may rotate in a clockwise direction such that pocket 41 aligns with pipe 28 and pocket 43 aligns with pipe 26 in FIG. V. At that point, the residual pressure in tank 13 and the pressure from pipe 26 act on the protein material. The pressure exerted on the protein material is sufficient to provide texturization. Good texturization has been obtained at 30 p.s.i.g. and apparently some texturization has been obtained even at 15 p.s.i.g. The pressure will generally be at least 55 p.s.i.g., preferably 80 to 110 p.s.i.g. The pressure exerted through pipe 26 by the fluid source 11 should be enough greater than the pressure exerted by the tank 13 that the protein material is rapidly forced through pipe 28, tube or chamber 14 and nozzle 59. The fluid provided by source 11 may be a fluid with a high heat transfer coefficient such as steam or a mixture of such a fluid with other gaseous fluid, for example, a mixture of steam and air. It is postulated that the texturization takes place immediately upon application of the pressure to the protein material by force from both the steam pipe 26 and the surge tank 13. In any event the protein material is texturized by the time it leaves the nozzle 59. Steam pressure continues to pass through valve 12 and pipe 28 for an instant following expulsion of the protein material from pipe 28. This raises the pressure of tank 13. Of course, some pressure is lost through the tube 14 and nozzle 59 for an instant following expulsion of the pieces of protein from nozzle 59. However, the proper pressure may be maintained in tank 13 because of the controlled orifice size in nozzle 59. It has been found that the protein material fails to texturize appreciably if the back pressure from the pressure tank 13 is reduced to below 15 p.s.i.g. The valve member 18 continues to rotate, pocket 43 aligns with exhaust pipe 27 and residual pressure in pockets 41, 43 and passageway 46 is relieved. Pocket 43 then reaches the feed port and is loaded with material to be texturized. The operational process then continues as described with respect to texturization using the pocket 41. Texturization takes place using pockets 42 and 44 substantially as described with respect to pockets 41 and 43. The valve member 18 may be rotated at any desired speed depending upon such things as the size of the pockets, the number of pockets and the feed rate of protein material.

Operation of nozzle 59 is illustrated in FIGS. VII–IX. During normal operation spring 77 urges gate 74 toward the closed position with sufficient force to maintain the desired back pressure in pipe 14 and at the same time maintain such back pressure substantially constant. Occasionally a large piece of textured protein is formed which enters the nozzle and momentarily blocks at least a portion of the orifice (FIG. VIII). The steam pressure then builds up until the force of spring 77 is overcome and gate 74 is opened sufficiently to allow passage of the large piece (FIG. IX). The spring 77 then returns gate 74 to the normal position of operation shown in FIG. VII.

Operation of nozzle 59A (FIGS. X–XII) is substantially like that of nozzle 59. The gates 74A and 74B during normal operation are urged toward a closed position (i.e., toward each other). Occasionally a large piece of textured protein is formed which enters the nozzle 59A and momentarily blocks the opening between the gates 74A and 74B. The steam pressure cannot escape and therefore builds up until the gates 74A and 74B are forced apart sufficiently to allow passage of the large textured piece. The gates 74A and 74B then return to the normal operating position.

The present invention may be used in texturizing various materials and using various operating conditions. The untextured protein may be a vegetable protein, such as soybean protein, a protist protein, such as yeast and other microbials, or animal protein, such as casein. The untextured feed material may be a typical defatted oil seed flour such as soybean flour, it may be a concentrate such as a soybean concentrate, or an isolate such as a soybean isolate. A material having a protein content as low as 30 percent (dry weight basis) and as high as 95 percent has been satisfactorily texturized according to the present invention. For most uses of textured protein contemplated by the present invention, the protein content will be at least 50%, preferably about 55 to 75%. The term "percent" means percent by weight unless otherwise specified.

Protein material, having a moisture content as low as 4 to 6 percent and as high as 40 percent by weight, may be texturized according to the present invention. Materials having moisture contents above 40 percent may be texturized according to the present invention; however, they tend to become sticky and difficult to handle. It has been found that increasing moisture content increases texturization. The maximum moisture content is believed to be limited only by the particular texturizing apparatus used. The range of moisture in the feed material is preferably between 16 and 26 percent and generally between 18 and 24 percent.

The maximum pressure used in the present invention is limited only by the particular apparatus used. In carrying out the invention using apparatus substantially like that shown in FIG. I, pressures as high as 140 p.s.i.g. and as low as 15 p.s.i.g. have been used. It has been found that an increase in pressure generally results in an increase in texturization and/or expansion. The preferred pressure conditions of the present invention are at least 25 p.s.i.g., generally at least 55 p.s.i.g., typically 80 to 110 p.s.i.g.

The textured protein of the present invention may be used for the same purposes and in substantially the same manner as previously known types of texturized protein. The protein material, as it comes from the texturizing apparatus, may be impregnated with conventional meat analog serum typically including binder, flavoring and water, thereby producing a simulated beef chunk or a simulated chicken chunk. The protein material may be ground, such as with a Comitrol Cutter®, hydrated and mixed with ground beef or pork sausage, thus acting as a meat extender. Alternatively, the texturized material may be finely chopped and impregnated with a conventional meat analog serum, thereby producing a simulated ground beef or simulated ground pork. For example, simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 part salt, 50 parts water, 24 parts texturized protein material, beef flavoring and sufficient caramel coloring to obtain the desired cooked hamburger color. The mixture may be heated to set the egg albumin.

EXAMPLE

Protein material was texturized according to the present invention using apparatus substantially like that shown in FIG. I using a nozzle substantially like that shown in FIGS. VII–IX. The protein material was a mixture of 70 parts soybean concentrate (Textrol[1]), 30 parts soybean isolate (Promine R[2]) and ½ part glycerol mono stearate (Myvaplex 601[3]). The mixture contained 20% moisture by weight. The feed rate of the mixture to the apparatus 10 was 14 pounds per minute. The temperature of the steam fed to the apparatus 10 was 450° F. The pressure in chamber 14 was about 78 p.s.i.g. The product was texturized and had a shear press value of 900. The product had a water holding capactiy of 2.0. Shear press values were determined by weighing out 75 grams (dry weight basis) of texturized protein material. The sample was placed in an excess of cold water and soaked at about 40° F. for 1.5 hours. The sample was drained for five minutes and divided into 3 equal parts by weight. The three parts were wrapped in plastic and allowed to stand at room temperature for 20 minutes. Each of the parts were tested in the Allo-Krammer Shear Press (Ser. No. 1042, Model No–5–2H) according to conventional techniques using a 2500-pound ring and a ten-bladed head. The three values are added together. The term "water holding capacity" refers to the total amount of water the protein material is able to hold and is determined by soaking the protein in an excess of water for 20 minutes and then draining for five minutes. The water holding capacity is equal to the wet weight minus the dry weight and that value divided by the dry weight.

---

[1] Textrol® is a processed soy protein material having a minimum protein content of 63.5% and is produced by Central Soya Co., Inc.
[2] Promine R® is an isolated soy protein material having a protein content of about 95% and is produced by Central Soya Co., Inc.
[3] Myvaplex 601® is a food grade concentrated glycerol mono stearate produced by DPI Division of Eastman Chemical Products, Inc.

The embodiments of the invention in which an exclusive property or privilege is claimed are defined as follows:

1. In an apparatus for texturizing particulate protein material having elongated cylinder means, including inlet feeding means adjacent a first end of said cylinder means and outlet means adjacent the other end of said cylinder means; means for maintaining a fluid pressure in said cylinder means; and means for applying a steam flow force to the protein material in said inlet feeding means to force the protein material through said elongated pressurized cylinder means and out of said outlet means; the improvement comprising:

means defining an adjustable orifice in said outlet means and means for adjusting said orifice in accordance with the amount of pressure in said cylinder means, whereby the size of said orifice is increased upon increase in said pressure and the size of said orifice is decreased upon decrease in said pressure thereby maintaining the pressure in said cylinder substantially constant.

2. The apparatus of claim 1 wherein said means defining an adjustable orifice is a nozzle including a cylinder and gate means mounted in said cylinder, said gate means being pivotable between a substantially closed position and a substantially open position, and wherein said adjusting means includes spring means for urging said gate means toward a substantially closed position.

3. The apparatus of claim 2 wherein said gate means comprise at least a pair of gates mounted for pivotable movement toward and away from one another.

4. In a method for texturizing particulate protein material including feeding the particulate protein material to an elongated treating chamber having an inlet at one end and an outlet at the other end, said material having sufficient protein content for texturizing, subjecting said particulate material while in said inlet with pressurized fluid from the direction of the chamber and subjecting the material to a steam flow from the direction of the inlet into the elongated chamber, the steam flow being of sufficient force to propel said material through the elongated chamber and out of the outlet, the pressure in said chamber being at least about 15 p.s.i.g.; the improvement comprising the step of adjustably controlling the amount of opening in the outlet in accordance with the amount of pressure in the chamber whereby said opening increases as said pressure increases and decreases as said pressure decreases.

5. The method of claim 4 wherein the pressure in said chamber is between 15 p.s.i.g. and 140 p.s.i.g. and the protein content is at least 30 percent by weight.

6. The method of claim 4 wherein the pressure in said chamber is at least 55 p.s.i.g. and the protein content is at least 50 percent by weight.

7. Apparatus for texturizing protein material comprising: elongated cylinder means having inlet feeding means adjacent a first end of said cylinder means and outlet means adjacent the other end of said cylinder means; said inlet feeding means comprising a rotary valve; said outlet means comprising a nozzle including walls defining an outlet passageway and gate means mounted in said passageway, said gate means controlling the amount of opening in said outlet passageway; and means for maintaining pressure in said cylinder means including steam flow through said inlet feeding means in the direction of said outlet means.

References Cited

UNITED STATES PATENTS 3,272,110   9/1971   Tsuchiya _____ 99—238 R

A. LOUIS MONACELL, Primary Examiner

W. A. SIMONS, Assistant Examiner

U.S. Cl. X.R.

99—238 PD, 14